US012704893B2

(12) United States Patent
Wang et al.

(10) Patent No.: US 12,704,893 B2
(45) Date of Patent: Aug. 11, 2026

(54) APPARATUS, METHOD, AND COMPUTER PROGRAM PRODUCT FOR REDUCING POWER CONSUMPTION IN A HIGH ACCURACY SENSING DEVICE

(71) Applicant: HONEYWELL INTERNATIONAL INC., Charlotte, NC (US)

(72) Inventors: Zhenhao Wang, Charlotte, NC (US); Xiangyu Li, Charlotte, NC (US); Jun Ge, Charlotte, NC (US); Wu Chen, Charlotte, NC (US); Jun Sun, Charlotte, NC (US); Lei Ai, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 201 days.

(21) Appl. No.: 18/606,825

(22) Filed: Mar. 15, 2024

(65) Prior Publication Data

US 2024/0329716 A1 Oct. 3, 2024

(30) Foreign Application Priority Data

Mar. 30, 2023 (CN) ........................ 202310327307.1

(51) Int. Cl.
*G06F 1/32* (2019.01)
*G06F 1/3215* (2019.01)
(Continued)

(52) U.S. Cl.
CPC .......... *G06F 1/3215* (2013.01); *G06F 1/3243* (2013.01); *G06F 1/3287* (2013.01)

(58) Field of Classification Search
CPC ..... G06F 1/3215; G06F 1/3243; G06F 1/3287
See application file for complete search history.

(56) References Cited

U.S. PATENT DOCUMENTS

2010/0302028 A1 12/2010 Desai et al.
2011/0087396 A1 4/2011 Eregen et al.
(Continued)

FOREIGN PATENT DOCUMENTS

CN 102450062 A 5/2012
CN 112549966 A 3/2021
(Continued)

OTHER PUBLICATIONS

Extended European Search Report Mailed on Jul. 11, 2024 for EP Application No. 24159670, 9 page(s).
(Continued)

*Primary Examiner* — Stefan Stoynov
(74) *Attorney, Agent, or Firm* — Alston & Bird LLP

(57) ABSTRACT

An example apparatus, method, and computer program product for reducing power consumption while maintaining a high accuracy in a sensing device is provided. The example apparatus may include a microcontroller and a sensing device electrically connected to the microcontroller. In an instance in which the microcontroller is enabled, the microcontroller may enable the sensing device and enter a low-power mode for a pre-determined sensor wait time. The microcontroller may further be configured to, upon expiration of the pre-determined sensor wait time, receive electrical data from the sensing device. Further, upon receipt of the electrical data, the microcontroller may disable power to the sensing device. In some embodiments, the apparatus may include a switch electrically connected between the sensing device and a power source, wherein the microcontroller is configured to send an electrical signal to the switch to control an input power to the sensing device.

20 Claims, 7 Drawing Sheets

(51) Int. Cl.
*G06F 1/3234* (2019.01)
*G06F 1/3287* (2019.01)

(56) References Cited

U.S. PATENT DOCUMENTS

| | | | | |
|---|---|---|---|---|
| 2014/0209481 | A1* | 7/2014 | Pletcher ................. | A61B 5/742 204/403.14 |
| 2019/0250579 | A1 | 8/2019 | Wang et al. | |
| 2019/0350502 | A1 | 11/2019 | Bohm et al. | |
| 2021/0163020 | A1 | 6/2021 | Jang et al. | |

FOREIGN PATENT DOCUMENTS

| | | | |
|---|---|---|---|
| CN | 114919415 | A | 8/2022 |
| EP | 2237978 | B1 | 10/2013 |
| KR | 10-2007-0105475 | A | 10/2007 |
| KR | 10-2010-0118567 | A | 11/2010 |

OTHER PUBLICATIONS

Communication about intention to grant a European patent Mailed on Nov. 3, 2025 for EP Application No. 24159670, 5 page(s).
English Translation of KR Office Action dated Oct. 1, 2025 for KR Application No. 10-2024-0036286, 5 page(s).
KR Office Action Mailed on Oct. 1, 2025 for KR Application No. 10-2024-0036286, 6 page(s).
Decision to grant a European patent Mailed on Mar. 5, 2026 for EP Application No. 24159670, 2 page(s).

* cited by examiner

APPARATUS, METHOD, AND COMPUTER PROGRAM PRODUCT FOR REDUCING POWER CONSUMPTION IN A HIGH ACCURACY SENSING DEVICE

CROSS-REFERENCE TO RELATED APPLICATIONS

This application claims priority pursuant to 35 U.S.C. 119(a) to Chinese Application No. 202310327307.1, filed Mar. 30, 2023, which application is incorporated herein by reference in its entirety.

TECHNOLOGICAL FIELD

Embodiments of the present disclosure relate generally to controlling the power consumption of a sensing device, and more particularly, to toggling the power of a sensing device and connected controller to reduce power consumption while maintaining a highly accurate sensor reading.

BACKGROUND

Applicant has identified many technical challenges and difficulties associated with reducing the power consumption of a sensing device while still maintaining accurate sensor readings. Through applied effort, ingenuity, and innovation, Applicant has solved problems related to reducing the power consumption of a high accuracy sensing device, which are described in detail below.

BRIEF SUMMARY

Various embodiments are directed to an example method, apparatus, and computer program product for reducing the power consumption of a sensing device while maintaining consistent and accurate sensor measurements.

In accordance with some embodiments of the present disclosure, an example apparatus for reducing the power consumption of a high accuracy sensing device is provided. The example apparatus may comprise a microcontroller and a sensing device electrically connected to the microcontroller. In some embodiments, in an instance in which the microcontroller is enabled, the microcontroller may enable the sensing device and enter a low-power mode for a pre-determined sensor wait time. In addition, the microcontroller may further be configured to, upon expiration of the pre-determined sensor wait time, receive electrical data from the sensing device. Further, upon receipt of the electrical data, the microcontroller may disable power to the sensing device.

In some embodiments, the apparatus may further comprise a switch electrically connected between the sensing device and a power source, wherein the microcontroller is further configured to send an electrical signal to the switch to control an input power to the sensing device.

In some embodiments, the apparatus may further comprising two modes: a sleep mode and an active mode. In some embodiments, during the sleep mode, both the microcontroller and the sensing device may be disabled. Further, at the onset of the active mode, the microcontroller and the sensing device may receive power.

In some embodiments, the apparatus may be further configured to alternate between the sleep mode and the active mode at a pre-determined interval.

In some embodiments, the sleep mode may have a longer duration than the active mode.

In some embodiments, the microcontroller may be configured to perform an action based on the electrical data after the microcontroller disables power to the sensing device. Further, in some embodiments, the electrical data may represent a physical characteristic of an environment proximate the sensing device.

In some embodiments, the sensing device may be in close proximity to a battery cell.

In some embodiments, the sensing device may comprise at least one of a pressure sensor, a temperature sensor, a gas sensor, and a sound sensor.

In some embodiments, the action may comprise at least one of determining an onset of thermal runaway in the battery cell and transmitting a warning.

In some embodiments, the pre-determined sensor wait time may be determined based at least in part on a minimum stabilization time for the sensing device.

In some embodiments, the pre-determined sensor wait time may be initially set to the minimum stabilization time and an initial sensor output correlated with the minimum stabilization time may be determined. In addition, in some embodiments, an update to the pre-determined sensor wait time may be performed periodically by: determining an updated pre-determined sensor wait time by reducing the pre-determined sensor wait time by a delta time, determining an updated sensor output correlated with the updated pre-determined sensor wait time, and in an instance in which the updated sensor output is within a threshold variation of the initial sensor output, set the pre-determined wait time to the updated pre-determined wait time.

In some embodiments, the microcontroller may be further configured to update the pre-determined sensor wait time based on an environment temperature at or near the sensing device.

An example method for reducing the power consumption of a sensing device is provided. In some embodiments, the example method may comprise, enabling the sensing device and entering a low-power mode for a pre-determined sensor wait time. Upon expiration of the sensor wait time, the method may further comprise entering an operational mode and receiving electrical data from the sensing device. Upon receipt of the electrical data, the method may further comprise disabling power to the sensing device.

In some embodiments, the method may further comprise sending an electrical signal to a switch electrically connected between the sensing device and a power source to control an input power to the sensing device.

In some embodiments, the method may further comprise alternating between a sleep mode and an active mode at a pre-determined interval, wherein enabling a sleep mode, comprises entering into a low-power mode and disabling the sensing device, and wherein enabling an active mode, comprises entering into an operational mode and enabling the sensing device.

In some embodiments, the method may further comprise performing an action based on the electrical data after the microcontroller disables power to the sensing device, wherein, the electrical data represents a physical characteristic of an environment proximate the sensing device.

In some embodiments, the action may comprise at least one of determining an onset of thermal runaway in a battery cell proximate the sensing device and transmitting a warning.

In some embodiments, the pre-determined sensor wait time may be determined based at least in part on a minimum stabilization time for the sensing device.

In some embodiments, the method may further comprise updating the pre-determined sensor wait time, wherein the pre-determined sensor wait time is initially set to the minimum stabilization time and an initial sensor output correlated with the minimum stabilization time is determined. Further, in some embodiments, an update to the pre-determined sensor wait time may be performed periodically by determining an updated pre-determined sensor wait time by reducing the pre-determined sensor wait time by a delta time; determining an updated sensor output correlated with the updated pre-determined sensor wait time; and in an instance in which the updated sensor output is within a threshold variation of the initial sensor output, setting the pre-determined wait time to the updated pre-determined wait time.

An example computer program product for controlling a sensing device is further provided. In some embodiments, the example computer program product may comprise at least one non-transitory computer-readable storage medium having computer-readable program code portions stored therein, the computer-readable program code portions comprising an executable portion configured to: enable a sensing device, enter a low-power mode for a pre-determined sensor wait time, upon expiration of the sensor wait time, enter an operational mode and receive electrical data from the sensing device, and upon receipt of the electrical data, disable power to the sensing device.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
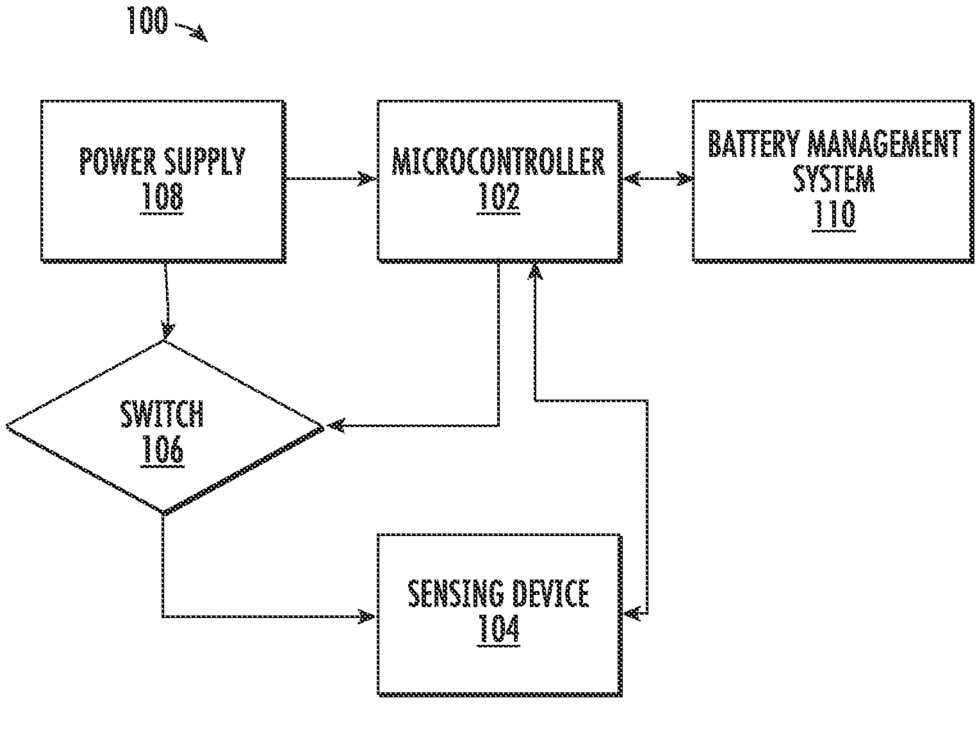
FIG. 1 illustrates an example block diagram of a sensing device power control apparatus in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with reducing the power consumption of a sensing device while still maintaining accurate sensor readings. As understood by those of skill in the field to which the present disclosure pertains, there are numerous scenarios in which it may be advantageous to receive accurate readings from a sensing device while minimizing power consumption. For example, various sensing devices are used to monitor pressure, temperature, gases, etc. inside and around a battery pack in an effort to detect the early onset of thermal runaway. Such sensing devices may need to monitor the battery pack, even when the device powered by the battery pack is disabled.

In general, batteries (e.g., lithium-ion batteries, lithium-polymer batteries, etc.) may undergo a chemical reaction within a battery cell to supply power to various devices. Devices requiring substantial amounts of power, such as electric vehicles, may contain tens or even hundreds of battery cells in a battery pack.

Battery cells utilizing chemical reactions to generate power may be susceptible to a number of dangerous conditions, for example thermal runaway. In certain circumstances, the movement of electrons and lithium ions in the battery cell may produce heat faster than the battery pack can dissipate the generated heat. Once the internal temperature of the battery cell reaches a certain point, the temperature of the battery cell may rise uncontrollably until the battery cell combusts. Not only can this dangerous condition occur in an individual battery cell but thermal runaway can cause an uncontrollable rise in temperature in the battery cells commonly contained within a battery pack, causing neighboring battery cells to also enter into thermal runaway. Eventually, a battery cell and/or battery pack, may combust causing an extremely hazardous condition. A battery cell may progress through the stages of thermal runaway rapidly, providing little time to detect and mitigate the hazardous condition before the chain reaction is irreversible.

The onset of thermal runaway may be preceded by the various stages of battery decay. For example, the battery cell may experience electrolysis, electrolyte vaporization, and first venting before entering into thermal runaway. Each of these stages is evidenced by particular characteristics, such as a particular range of temperatures, internal pressures, and the presence of certain gases. For example, the pressure within a battery pack may steadily increase over time due to internal chemical reactions, the rise in temperature within the battery pack, emitted gases, and other factors.

Various sensing devices may be employed to determine the onset of thermal runaway in a battery pack. For example, a temperature sensor may be utilized to detect a sudden rise in temperature near a battery pack. Similarly, a pressure sensor may be placed near a battery pack to detect a sudden increase followed by a decrease in pressure within the battery pack, indicating first venting and the onset of thermal runaway. In addition, gas sensors, sound sensors, and other sensors may be placed in or around a battery pack to detect changes in the surrounding environment indicative of the onset of thermal runaway.

To safely detect thermal runaway before the battery pack combusts and endangers any persons or objects in the near vicinity, the detection mechanisms, including the various sensing devices may run while the device powered by the battery pack (e.g., electrical vehicle) is disabled. To continuously run while the device is disabled, the sensing devices must be able to operate in a low-power state.

In some examples, a battery management system or other controller may continuously enable and disable a sensing device. For example, a controller may turn off the sensing device for an extended period of time and then enable the sensing device and quickly read the sensor reading before disabling the device once again. In some examples, the time the sensing device is disabled may be much greater than the time the sensing device is enabled. However, some sensing devices require a certain start-up time to pass before the sensing device operates in a stable condition. On certain sensing devices, such a start-up time may even be recommended by the manufacturer. Failure to allow the sensing device to stabilize may result in fluctuation of initial readings. Such a fluctuation may trigger a false alarm indicating the onset of thermal runaway and performing mitigating actions, even when thermal runaway is not occurring.

In addition, both the controlling device and the sensing device may not need to be enabled for the full duration of time the device is active. Enabling both the controlling device and the sensing device for the full duration of the apparatus active mode may unnecessarily consume available power.

The various example embodiments described herein utilize various techniques to reduce the power consumed by a sensing device while maintaining accurate sensor readings. For example, the sensing device power control apparatus described herein may receive power in an active mode for a pre-determined period of time. Once in the active mode, the microcontroller may determine a minimum sensor wait time required for the sensor device to maintain stable measurements. The minimum sensor wait time may be initially based on the max stabilization time established by the manufacturer of the sensing device but may be reduced based on a sensor wait time update procedure.

In addition, the microcontroller may utilize a switch to enable and disable power to the sensing device. Upon receipt of power during initiation of the active mode, the microcontroller may enable power to the sensing device, through a switch, for at least a minimum sensor wait time. The microcontroller may then enter a low-power mode for approximately the duration of the minimum sensor wait time. Upon expiration of the sensor wait time, the microcontroller may awake from the low-power state and read the output of the sensing device which is now operating in a stable state. In some embodiments, the microcontroller may then disable the sensing device while performing calculations and other actions based on the returned sensing device measurements. Once the microprocessor has completed processing, both the microcontroller and the sensing device may be disabled in a sleep mode for a pre-determined amount of time. In some embodiments, the sleep mode may be significantly longer than the active mode.

As a result of the herein described example embodiments and in some examples, the accuracy of a sensing device during low-power operation may be greatly improved. Such improvements may enable the apparatus to accurately detect environmental characteristics representative of the onset of thermal runaway during low-power operation of the apparatus and connected device.

Referring now to FIG. 1, an example sensing device power control apparatus 100 is provided. As depicted in FIG. 1, the example sensing device power control apparatus 100 includes a microcontroller 102 electrically connected to and configured to receive input power from a power supply 108. The microcontroller 102 is further communicatively connected to a switch 106, wherein the switch 106 controls the flow of power between the power supply 108 and a sensing device 104. In addition, the microcontroller 102 is communicatively connected to the sensing device 104, wherein the microcontroller 102 is configured to receive measurements from the sensing device 104. Further, in the depicted sensing device power control apparatus 100 the microcontroller 102 is communicatively connected to a battery management system 110 in order to communicate the status of the sensing device 104 and surrounding environment.

As depicted in FIG. 1, the example sensing device power control apparatus 100 includes a microcontroller 102. A microcontroller 102 may be any computing device including hardware, firmware, software, or any combination thereof, configured to execute a set of instructions, for example, according to instructions stored in a memory, and/or configured to perform hard-coded functionality, related to the functionality described herein.

As described herein, a microcontroller 102 may be further configured to enable and disable a low-power or no-power mode using an internal timer or an external timer. For example, in some embodiments, the microcontroller 102 may set an internal or external timer upon start-up. The microcontroller 102 may then enter a low-power or no-power mode until expiration of the internal or external timer. In some embodiments, a low-power mode of a microcontroller 102 may involve disabling certain functionality of the microcontroller 102, such as input/output devices. The microcontroller 102 may further reduce clock speeds, reduce the supply voltage, and perform other operations to reduce the overall power consumption of the microcontroller 102. Upon expiration of the internal or external timer, the microcontroller 102 is revived and once again begins normal operation. Such functionality enables a microcontroller 102 to enter a low-power mode for a pre-determined interval. For example, the microcontroller 102 may set an internal or external timer for a pre-determined time (e.g., sensor wait time), the microcontroller may then enter a low-power mode awaiting expiration of the internal or external timer to begin normal operation.

Figure 2:
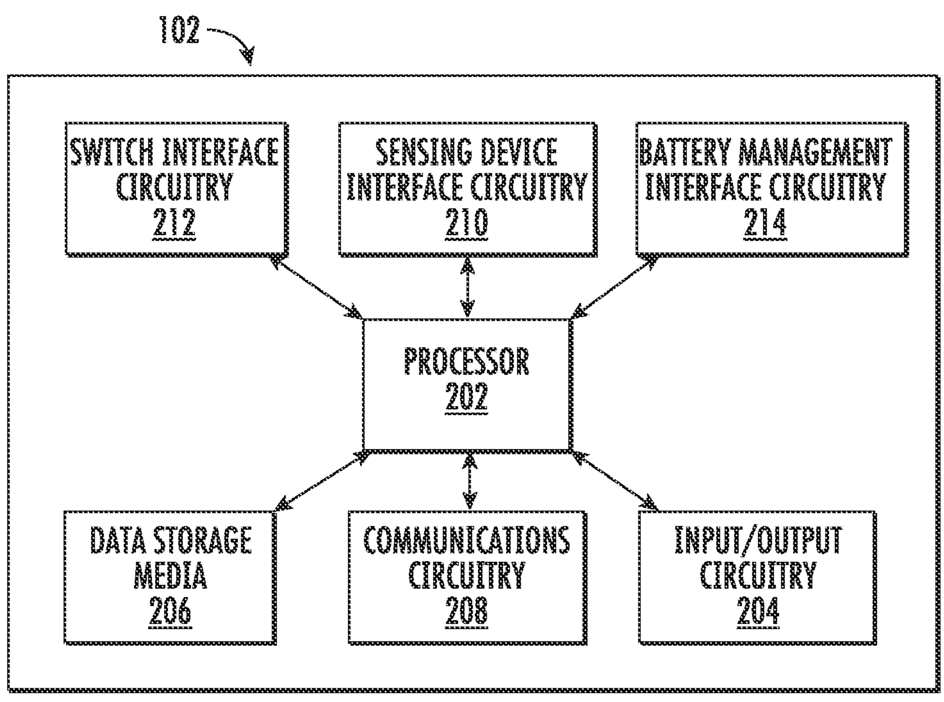
FIG. 2 illustrates an example block diagram showing example components of an example microcontroller in accordance with an example embodiment of the present disclosure.

An example block diagram and corresponding description of an example microcontroller 102 are described in relation to FIG. 2.

As further depicted in FIG. 1, the example sensing device power control apparatus 100 includes a sensing device 104. A sensing device 104 may be any electrical, mechanical, and/or electro-mechanical device capable of detecting or measuring a physical property associated with a surrounding environment. For example, a sensing device 104 may comprise a gas sensor, a sound sensor, a pressure sensor, a temperature sensor, a humidity sensor, or other sensing device capable of measuring a physical property of the surrounding environment. Physical properties may include internal and external temperatures, internal and external pressures, voltage readings, gasses present, sound waves detected, optical light waves detected, and other physical characteristics. In some embodiments, one or more sensing devices 104 may be attached in, on, or near a battery pack in order to monitor characteristics of the onset of thermal runaway. Non-limiting examples of sensing devices 104 may include pressure sensors, force sensors, temperature sensors, moisture sensors, light sensors, gas sensors, alcohol sensors, gyroscope sensors, and the like.

As depicted herein, a sensing device 104 may require a minimum stabilization time (e.g., sensor wait time) for the output measurements of the sensing device 104 to become stable. In some embodiments, a sensing device 104 may experience abnormal and rapid changes in readings during startup. Such abnormal readings may be expected during the initial startup of components associated with the sensing device 104. As such, some sensing devices 104 may operate at least for the duration of the minimum stabilization time before sensor measurements are read. In some embodiments, the sensing device 104 readings upon start-up may fluctuate by as much as 3-4%. Such fluctuation may be enough to trigger an alarm, for example, a false alarm of the detection of the onset of thermal runaway. The stabilization time or sensor wait time allows a sensing device 104 to stabilize measurements before readings begin. In some instances, the stabilization time may be determined by a manufacture based on the components of the sensing device 104, or based on product testing. In some embodiments, as described in relation to FIG. 6-FIG. 7, further testing may be completed to update the stabilization time or sensor wait time.

Once a sensing device 104 is operating in a stable state, sensor measurements may be used to determine the state of the environment. For example, in an instance in which the sensing device 104 is in or near a battery pack, the measurements from the sensing device may be used to detect any operational anomalies, for example, if the battery pack is entering into thermal runaway. Early detection of such operational anomalies may allow mitigation of the battery condition before the condition becomes hazardous.

In one particular example embodiment, a sensing device may comprise a pressure sensor. A pressure sensor may be any electrical, mechanical, and/or electro-mechanical device capable of generating a signal as a function of the pressure imposed by the surrounding atmosphere. As gases are released into an interior battery compartment of a battery pack, and as the heated air within the interior battery compartment expands, the pressure within the interior battery compartment will increase. A sudden increase in pressure, within a battery pack may be an indicator that thermal runaway has occurred or is occurring. The pressure sensor sensing device 104 may be coupled with circuitry to provide an electrical output representing the pressure within the interior battery compartment, which may be transmitted to the microcontroller 102 and/or a battery management system 110.

In some embodiments, the electrical output of the sensing device 104 may be transmitted to the microcontroller 102 or other connected component for further analysis. In some embodiments, the sensing device 104 may communicate with the microcontroller 102 or other connected component through wireless protocols, for example, IEEE 802.11 Wi-Fi, near field communication (NFC) protocols, Wibree, Bluetooth protocols, wireless universal serial bus (USB) protocols, and/or any other wireless protocol.

As further depicted in FIG. 1, the example sensing device power control apparatus 100 includes a switch 106. A switch 106 may be any electrical or electromechanical device configured to interrupt or divert the flow of electrical current. For example, as depicted in FIG. 1, the switch 106 is positioned between the power supply 108 and the sensing device 104. In an instance in which the switch 106 is in a closed position, an electrical connection is made between the power supply 108 and the sensing device 104, such that the sensing device 104 is operational. In an instance in which the switch 106 is in an open position, no electrical connection between the power supply 108 and the sensing device 104 is made and the sensing device 104 is disabled.

In some embodiments, the switch 106 may be controlled by a separate device, such as the microcontroller 102. In such an instance, the microcontroller 102 may transmit one or more electrical signals to the switch 106 to open or close the switch 106. In an instance in which the microcontroller 102 sends an electrical signal to open the switch 106, power from the power supply 108 is cut-off from the sensing device 104 and the sensing device 104 enters a low-power or sleep mode. In an instance in which the microcontroller 102 sends an electrical signal to close the switch 106, electrical contacts are made such that power is provided to the sensing device 104 and the sensing device enters an operational phase.

As further depicted in FIG. 1, the example sensing device power control apparatus 100 includes a battery management system 110. A battery management system 110 may be any device, apparatus, circuitry, or other similar mechanism embodied in either hardware, software, firmware, or a combination thereof that is configured to receive input data related to the state of a battery pack and cause actions to be taken based on the state of the battery. The battery management system 110, may control charging of the battery pack, may monitor and alert based on charge levels, may monitor overcharging/under charging of a battery pack, and may perform other similar tasks in relation to the management and health of a battery pack. In addition, a battery management system 110 may receive measurements related to the physical condition of a battery and the surrounding environment (e.g., from one or more sensing devices 104) and may determine if the battery has entered or is about to enter thermal runaway. The battery management system 110 may further initiate mitigating actions in an instance in which the onset of thermal runaway is detected. For example, the battery management system 110 may disable power to one or more components of the battery pack and/or perform one or more actions to offset the onset of thermal runaway. As depicted in FIG. 1, the battery management system 110 may receive measurement data from the microcontroller 102, however, in some embodiments, the battery management system 110 may receive measurement data directly from the one or more sensing devices 104.

Referring now to FIG. 2, FIG. 2 illustrates an example microcontroller 102 in accordance with at least some example embodiments of the present disclosure. The microcontroller 102 includes processor 202, input/output circuitry 204, data storage media 206, communications circuitry 208, sensing device interface circuitry 210, switch interface circuitry 212, and battery management interface circuitry 214. In some embodiments, the microcontroller 102 is configured, using one or more of the sets of circuitry 202, 204, 206, 208, 210, 212, and/or 214, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the microcontroller 102 provide or supplement the functionality of other particular sets of circuitry. For example, the processor 202 in some embodiments provides processing functionality to any of the sets of circuitry, the data storage media 206 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the data storage media 206 via a bus for passing information among components of the microcontroller 102. In some embodiments, for example, the data storage media 206 is non-transitory and may include, for example, one or more volatile and/or non-volatile memories. In other words, for example, the data storage media 206 in some embodiments includes or embodies an electronic storage device (e.g., a computer readable storage medium). In some embodiments, the data storage media 206 is configured to store information, data, content, applications, instructions, or the like, for enabling the microcontroller 102 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the microcontroller 102, and/or one or more remote or "cloud" processor(s) external to the microcontroller 102.

In an example embodiment, the processor 202 is configured to execute instructions stored in the data storage media 206 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with controlling the input power to a sensing device. In some embodiments, the processor 202 includes hardware, software, firmware, and/or a combination thereof, that enables the sensing device. Additionally or alternatively, in some embodiments, the processor 202 includes hardware, software, firmware, and/or a combination thereof, that enables a low-power mode for a pre-determined sensor wait time. Additionally or alternatively, in some embodiments, the processor 202 includes hardware, software, firmware, and/or a combination thereof, that upon expiration of the sensor wait time, enters an operational mode and receives electrical data from the sensing device. Additionally or alternatively, in some embodiments, the processor 202 includes hardware, software, firmware, and/or a combination thereof, that upon receipt of the electrical data, disables power to the sensing device.

In some embodiments, the microcontroller 102 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media 206, and/or the like). In some embodiments, the input/output circuitry 204 includes or utilizes a user-facing application to provide input/output functionality to a client device and/or other display associated with a user.

In some embodiments, the microcontroller 102 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the microcontroller 102. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the microcontroller 102.

The sensing device interface circuitry 210 includes hardware, software, firmware, and/or a combination thereof, that supports various functionality associated with configuring a sensing device and receiving sensor measurements from the sensing device. For example, in some embodiments, the sensing device interface circuitry 210 includes hardware, software, firmware, and/or a combination thereof to communicate with the sensing device according to an established protocol to provide appropriate configuration parameters to set and/or maintain parameters associated with the frequency and format of sensing device data. Additionally or alternatively, in some embodiments, the sensing device interface circuitry 210 includes hardware, software, firmware, and/or a combination thereof, that complies with the communication protocol of the sensing device to receive messages from the sensing device, for example, messages reporting the physical condition proximate the sensing device. Additionally or alternatively, in some embodiments, the sensing device interface circuitry 210 includes hardware, software, firmware, and/or a combination thereof, that interprets the received messages from the sensing device to determine the physical characteristics associated with the electrical output received from the sensing device. In some embodiments, the sensing device interface circuitry 210 includes a separate processor, specially configured field programmable gate array (FPGA), or a specially programmed application specific integrated circuit (ASIC).

The switch interface circuitry 212 includes hardware, software, firmware, and/or a combination thereof, that supports various functionality associated with configuring a switch to provide power to the sensing device. For example, in some embodiments, the switch interface circuitry 212 includes hardware, software, firmware, and/or a combination thereof to communicate with the switch according to an established protocol to enable or disable the flow of power from the power supply to the sensing device. Additionally or alternatively, in some embodiments, the switch interface circuitry 212 includes hardware, software, firmware, and/or a combination thereof, that may configure the switch to perform operations automatically, for example, based on a timer or on a triggering event. Additionally or alternatively, in some embodiments, the switch interface circuitry 212 includes hardware, software, firmware, and/or a combination thereof, that enables receipt of status messages from the switch, reporting on the status of the switch device. In some embodiments, the switch interface circuitry 212 includes a separate processor, specially configured field programmable gate array (FPGA), or a specially programmed application specific integrated circuit (ASIC).

The battery management interface circuitry 214 includes hardware, software, firmware, and/or a combination thereof, that supports various functionality associated with configuring a battery management system in relation to communication and coordination with the mirocontroller. For example, in some embodiments, the battery management interface circuitry 214 includes hardware, software, firmware, and/or a combination thereof to communicate according to an established protocol with the microcontroller. Such communication may involve the setting of watchdog timers, the configuration of reporting mechanisms, and so forth. Additionally or alternatively, in some embodiments, the battery management interface circuitry 214 includes hardware, software, firmware, and/or a combination thereof, that determines the onset of thermal runaway based on sensor readings and/or determines the mitigating actions required based on the determination of the onset of thermal runaway by a microcontroller. In some embodiments, the battery management interface circuitry 214 includes a separate processor, specially configured field programmable gate array (FPGA), or a specially programmed application specific integrated circuit (ASIC).

Additionally or alternatively, in some embodiments, one or more of the sets of circuitry 202-214 are combinable. Additionally or alternatively, in some embodiments, one or more of the sets of circuitry perform some or all of the functionality described associated with another component. For example, in some embodiments, one or more sets of circuitry 202-214 are combined into a single module embodied in hardware, software, firmware, and/or a combination thereof. Similarly, in some embodiments, one or more of the sets of circuitry, for example sensing device interface circuitry 210, switch interface circuitry 212, and/or battery management interface circuitry 214, is/are combined such that the processor 202 performs one or more of the operations described above with respect to each of these circuitry individually.

Figure 3:
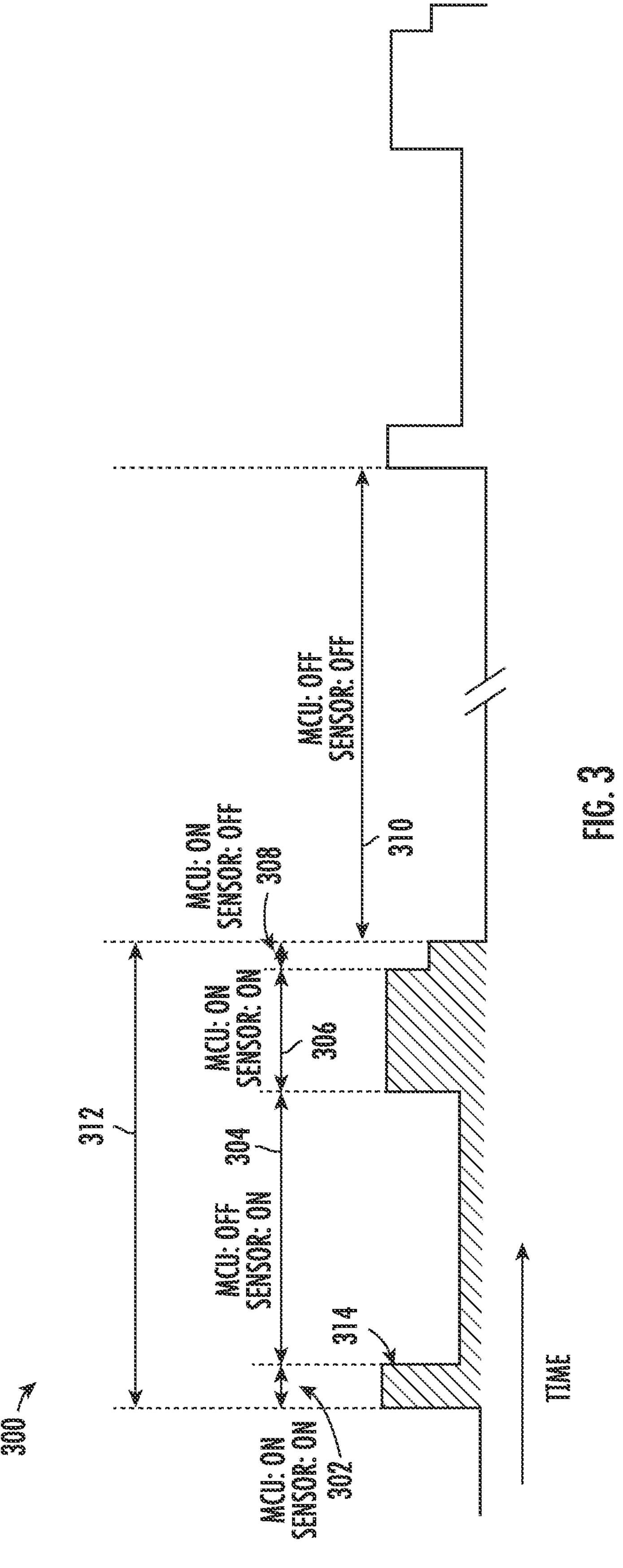
FIG. 3 illustrates an example power diagram over time of an example sensing device power control apparatus in accordance with an example embodiment of the present disclosure.

Referring now to FIG. 3, an example power diagram 300 illustrating the power sequence of the sensing device power control apparatus 100 over time is provided. During time period 302, both the microcontroller 102 and the sensing device 104 are in an operational state, each receiving power from the power supply 108, the microcontroller 102 receiving power directly from the power source and the sensing device 104 receiving power from the power supply 108 through the switch 106. The onset of time period 302 marks the beginning of the active mode time period 312 of the sensing device power control apparatus 100. Thus, the time period 302 may be triggered by the expiration of an internal or external timer. For example, an external or internal timer may be set for the duration of the sleep mode of the sensing device power control apparatus 100. In an instance in which the internal or external timer expires, the microcontroller 102 may power up into a normal operation mode. In some embodiments, the microcontroller 102 may be configured to enable the switch 106 upon start-up such that power from the power supply 108 is provided to the sensing device 104 upon initialization of the microcontroller. In some embodiments, the switch 106 may enable power output to the sensing device 104 by default. In either scenario, upon entry into active mode, both the microcontroller 102 and the sensing device 104 receive power. During the time period 302, the microcontroller 102 may determine a sensor wait time and/or configure a timer such that the microcontroller 102 enters a low-power mode for the duration of the sensor wait time. In some embodiments, the time period 302 may be characterized by a time period between 1 and 1000 microseconds.

As shown in FIG. 3, the power consumption line graph 314 indicates the total power consumed by the sensing device power control apparatus 100 during a particular time period. As shown on the power diagram 300, the power consumption line graph 314 is at a maximum during time period 302 because both the microcontroller 102 and the sensing device 104 are consuming power.

During time period 304, the microcontroller 102 remains in a low-power mode while the sensing device 104 operates at normal operating power. In some embodiments, the microcontroller may set an internal or external timer previous to entering a low-power mode such that the microcontroller 102 will remain in low-power mode for the duration of time period 304 and awake upon expiration of the time period 304. During the time period 304, the sensing device 104 may be experiencing a stabilization phase. As such, the output measurements from the sensing device 104 during the time period 304 may experience anomalies and/or fluctuations. The time period 304 may be configured to last as long or longer than the minimum stabilization time of the sensing device 104. Thus, upon expiration of the time period 304, the sensing device 104 may be generating a stable output. The minimum stabilization time (e.g., sensor wait time) may be equivalent to the minimum stabilization time period for the sensing device 104 as provided by the manufacturer. However, in some embodiments, an updated minimum stabilization time may be determined, such as through the process described in FIG. 6-FIG. 7.

As shown in FIG. 3, the power consumption line graph 314 indicates the total power consumed by the sensing device power control apparatus 100 during time period 304 is significantly lower than time periods when the microcontroller 102 is operating in a normal operation mode.

During time period 306, the timer establishing the duration of the microcontroller 102 low-power mode expires and the microcontroller 102 enters into a normal operating mode. As the sensing device 104 has stabilized, the microcontroller 102 may begin reading sensor measurements immediately upon entering normal operation. The time period 306 lasts long enough for the microcontroller 102 to gather sufficient sensing device 104 measurements to make determinations related to the physical environment surrounding the sensing device 104, for example, 1-100 milliseconds. As shown in FIG. 3, the power consumption line graph 314 is once again at a maximum because both the microcontroller 102 and the sensing device 104 are operating in a normal operating mode. Once the microcontroller 102 has completed gathering measurements from the sensing device 104, the microcontroller 102 disables power to the sensing device 104 by sending an electrical signal to the switch 106. The microcontroller 102 configures the switch 106 to open, such that no electrical contact is made between the power supply 108 and the sensing device 104 and no power is provided to the sensing device 104.

During time period 308, the sensing device 104 is disabled while the microcontroller 102 continues in operation. As shown in FIG. 3, the power consumption line graph 314, representing the total power consumed by the sensing device power control apparatus 100 is once again reduced because the sensing device 104 is disabled while the microcontroller 102 is operating in a normal operating mode. During time period 308, the microcontroller 102 may perform one or more actions based on the electrical data received from the sensing device 104. For example, the microcontroller 102 may make determinations based on the measurement values returned by the sensing device 104 during time period 306. The microcontroller 102 may make calculations, comparisons, or other determinations related to the physical characteristics of the surrounding environment. In addition, the microcontroller 102 may transmit measurements, calculations, and determinations to the battery management system 110 for further conclusions and mitigating actions. Further, the microcontroller 102 may configure the sensing device power control apparatus 100 for entering sleep mode. For example, the microcontroller 102 may initialize a timer establishing the duration of the sleep mode.

During time period 310, both the microcontroller 102 and the sensing device 104 are disabled. As shown in FIG. 3, the power consumption line graph 314, representing the total power consumed by the sensing device power control apparatus 100 is at or near zero during time period 310. The time period 310 represents a period of time when the sensing device power control apparatus 100 is in a sleep mode, in contrast to time period 312 when the sensing device power control apparatus 100 is in an active mode. In some embodiments, the sensing device power control apparatus 100 sleep mode, as indicated by time period 310, may be significantly longer than the active mode, as indicated by time period 312. For example, the time period 310 may be hundreds of seconds long, while the time period 312 occurs in under a second.

Figure 4:
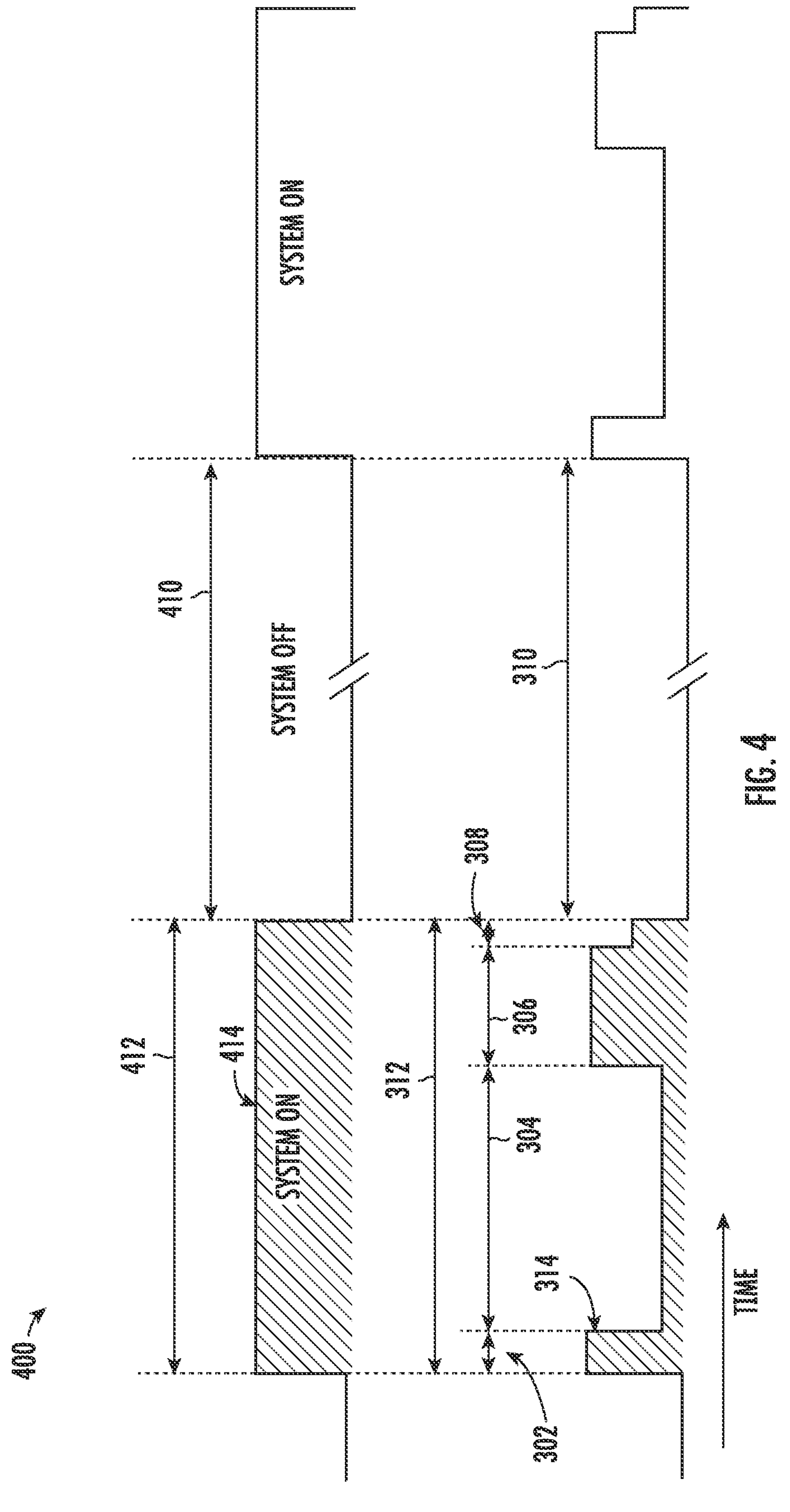
FIG. 4 illustrates an example power diagram over time of an example sensing device power control apparatus as compared to a traditional power saving sensing device, in accordance with an example embodiment of the present disclosure.

Referring now to FIG. 4, a power consumption line graph 414 represents the power consumption of a sensing device power control apparatus 100 in an instance in which the active mode 412 comprises enabling both the sensing device 104 and the microcontroller 102 for the entire duration of the active mode 412. As depicted in FIG. 4, the power consumption line graph 414 is constant during the active mode 412. However, the power consumption line graph 314 during the active mode time period 312 is reduced for significant periods of time and never exceeds the power consumption line graph 414. As depicted in FIG. 4, the power consumption line graph 314 represents a 60%-70% savings in power over the power consumption line graph 414 of a standard sensing device power control apparatus that simply enables all devices during an active mode and disables all devices during a sleep mode.

Figure 5:
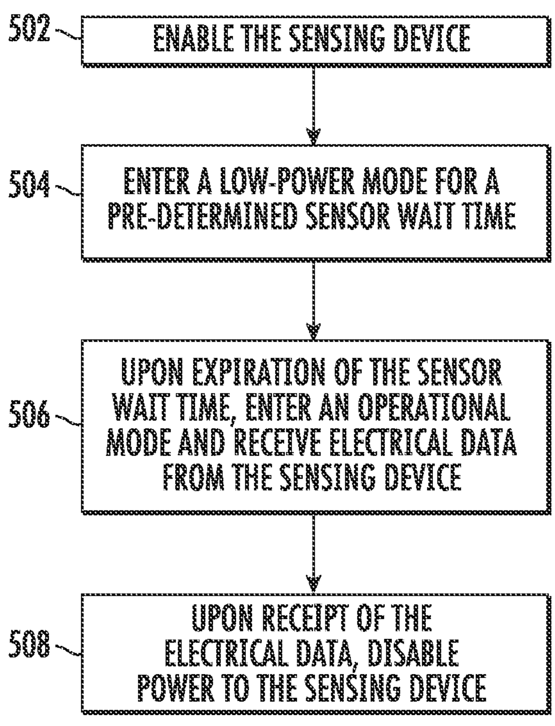
FIG. 5 illustrates an example flowchart depicting an example method for controlling power to a sensing device in accordance with an example embodiment of the present disclosure.

Referring now to FIG. 5, a process 500 for controlling the operation of a sensing device (e.g., sensing device 104) on a sensing device power control apparatus (e.g., sensing device power control apparatus 100) is provided. At block 502, a microcontroller (e.g., microcontroller 102) enables a sensing device. As described herein, the microcontroller may be configured to close a switch (e.g., switch 106) providing power to the sensing device by default. In some embodiments, the switch may be automatically enabled to provide power to the sensing device upon receipt of power from the power supply 108.

At block 504, the microcontroller enters a low-power mode for a pre-determined sensor wait time. As described herein, the microcontroller may be configured to enable an internal or external timer which upon expiration may awake the microcontroller from a low-power mode. The microcontroller may configure the external or internal timer according to a pre-determined sensor wait time. The pre-determined sensor wait time may be determined based on a manufacturer's recommended sensor wait time corresponding to the time required for the sensing device to provide stable output measurements. In some embodiments, the pre-determined sensor wait time may be updated based on an update process similar to that described in relation to FIG. 6-FIG. 7.

At block 506, upon expiration of the sensor wait time, the microcontroller enters an operational mode and receives electrical data from the sensing device. After the sensor wait time has expired, the sensing device may be outputting stable device measurements. The microcontroller is reenabled by the expiration of the sensor wait time and may immediately begin to read measurements from the sensing device. Disabling the microcontroller for the sensor wait time enables the sensing device power control apparatus to conserve power and improve accuracy based on the stability of the received measurements.

At block 508, upon receipt of the electrical data, the microcontroller may disable power to the sensing device. Once the microcontroller has received sufficient measurements to determine the physical condition of the environment surrounding the sensing device, the microcontroller may disable power to the sensing device. In some embodiments, the microcontroller may disable power to the sensing device by opening a switch (e.g., switch 106) between the power supply and the sensing device. By opening the switch, the electrical contact between the power supply and the sensing device is broken and no power is delivered to the sensing device. The microcontroller may continue to operate once the sensing device has been disabled. For example, the microcontroller may perform calculations on the received measurements, the microcontroller may analyze the received data, and the microcontroller may further transmit data related to the physical environment around the sensing device to the battery management system. Disabling the sensing device while the microcontroller performs operations based on the received data allows the sensing device power control apparatus to operate accurately while using less power. In addition, at block 508, the microcontroller may initiate a timer to initiate the sleep mode. Such a timer will re-enable the microcontroller once the sleep mode timer has expired.

Figure 6:
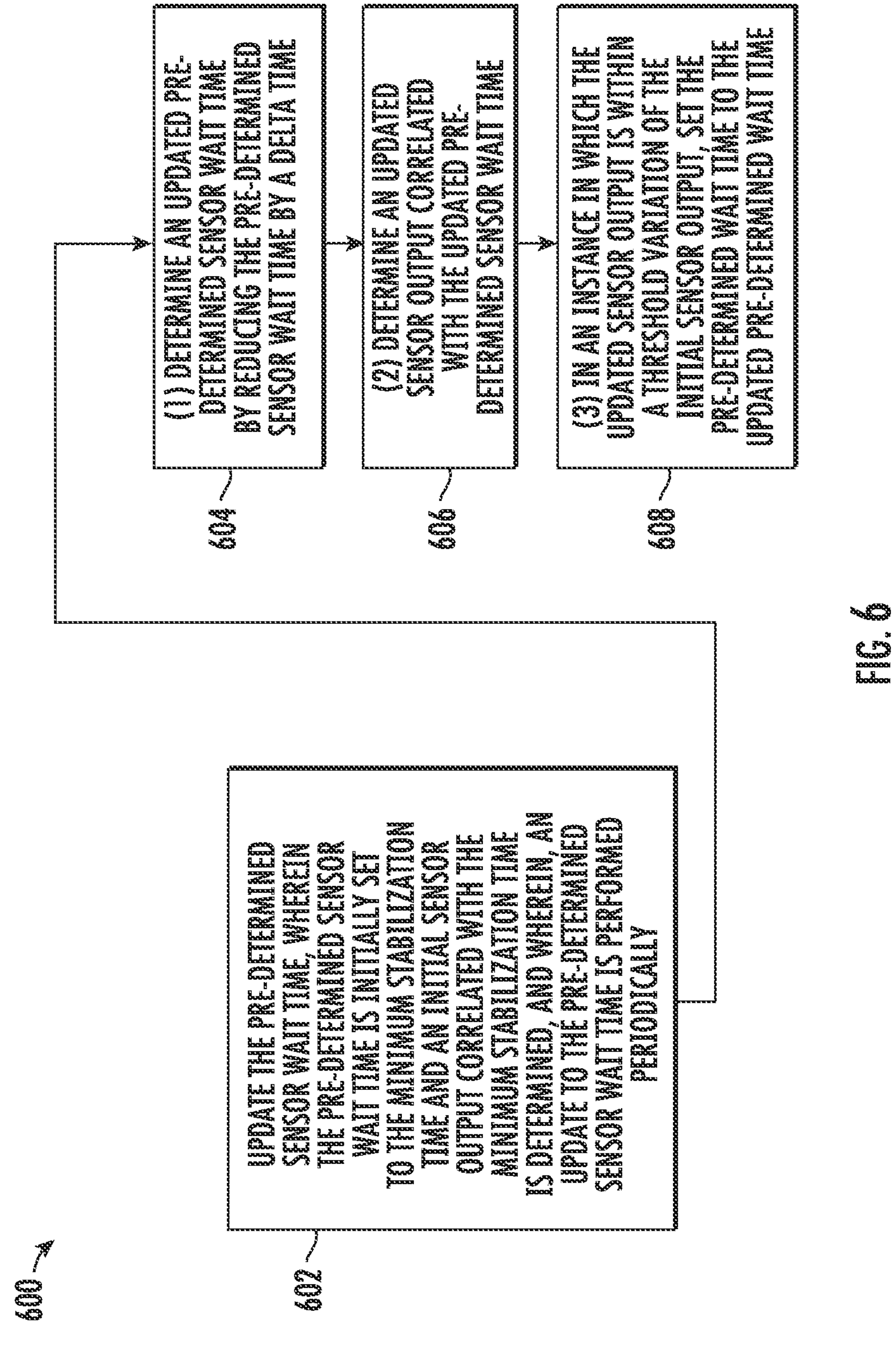
FIG. 6 illustrates an example flowchart for updating the sensor wait time in accordance with an example embodiment of the present disclosure.

Referring now to FIG. 6, a flowchart illustrating an example process 600 for determining a sensor wait time based on a minimum stabilization time of a sensing device is provided. At step 602, a processing device (e.g., microcontroller 102 or other processing device) updates the pre-determined sensor wait time, wherein the pre-determined sensor wait time is initially set to the minimum stabilization time, and wherein, an update to the pre-determined sensor wait time is performed periodically. The process 600 for determining a sensor wait time based on the minimum stabilization time begins with the sensor wait time being set to the minimum stabilization time. The minimum stabilization time may be determined by a manufacturer or supplier through testing and/or through analysis of the components of the sensing device. The minimum stabilization time may further include tolerances and additional time to ensure stable output measurements in all environments. The minimum stabilization time represents the maximum sensor wait time necessary to ensure stable measurements are received from the sensing device upon startup. Updates to the sensor wait time may reduce the sensor wait time from the initialized maximum sensor wait time.

In addition, a sensor measurement representing the initial sensor output after the sensor has been enabled for at least the minimum stabilization time may be recorded. By waiting the minimum stabilization time before recording the initial sensor output, the sensing device has had sufficient time to stabilize and the recorded initial sensor output represents the measured output of the sensing device when the sensing device is stable.

At step 604, the processing device determines an updated pre-determined sensor wait time by reducing the pre-determined sensor wait time by a delta time. An updated pre-determined sensor wait time may be determined by subtracting a delta time from the pre-determined sensor wait time. The pre-determined delta time may be determined experimentally based on the sensing device, the sensing environment, and the minimum stabilization time for the sensing device.

At step 606, the processing device determines an updated sensor output correlated with the updated pre-determined sensor wait time. The updated sensor output represents the output from the sensing device after a reduced stabilization time is implemented. Determining an updated sensor output correlated with the updated pre-determined sensor wait time enables a determination about the stability of the sensing device after the updated pre-determined sensor wait time to be made.

At step 608, in an instance in which the updated sensor output is within a threshold variation of the initial sensor output, the processing device sets the pre-determined wait time to the updated pre-determined wait time. The threshold variation may be determined through an experimental process and/or based on the physical components of the sensing device. The threshold variation may represent an acceptable range of deviation of the sensing device for which the sensing device measurements may still be considered stable. In an instance in which the difference between initial sensor output and the updated sensor output is less than or equal to the threshold variation, it may be determined that the updated sensor output is a stable sensing device measurement and the updated pre-determined wait time may be used as a sensor wait time. In such an instance, the sensor wait time is set to the updated pre-determined wait time.

Figure 7:
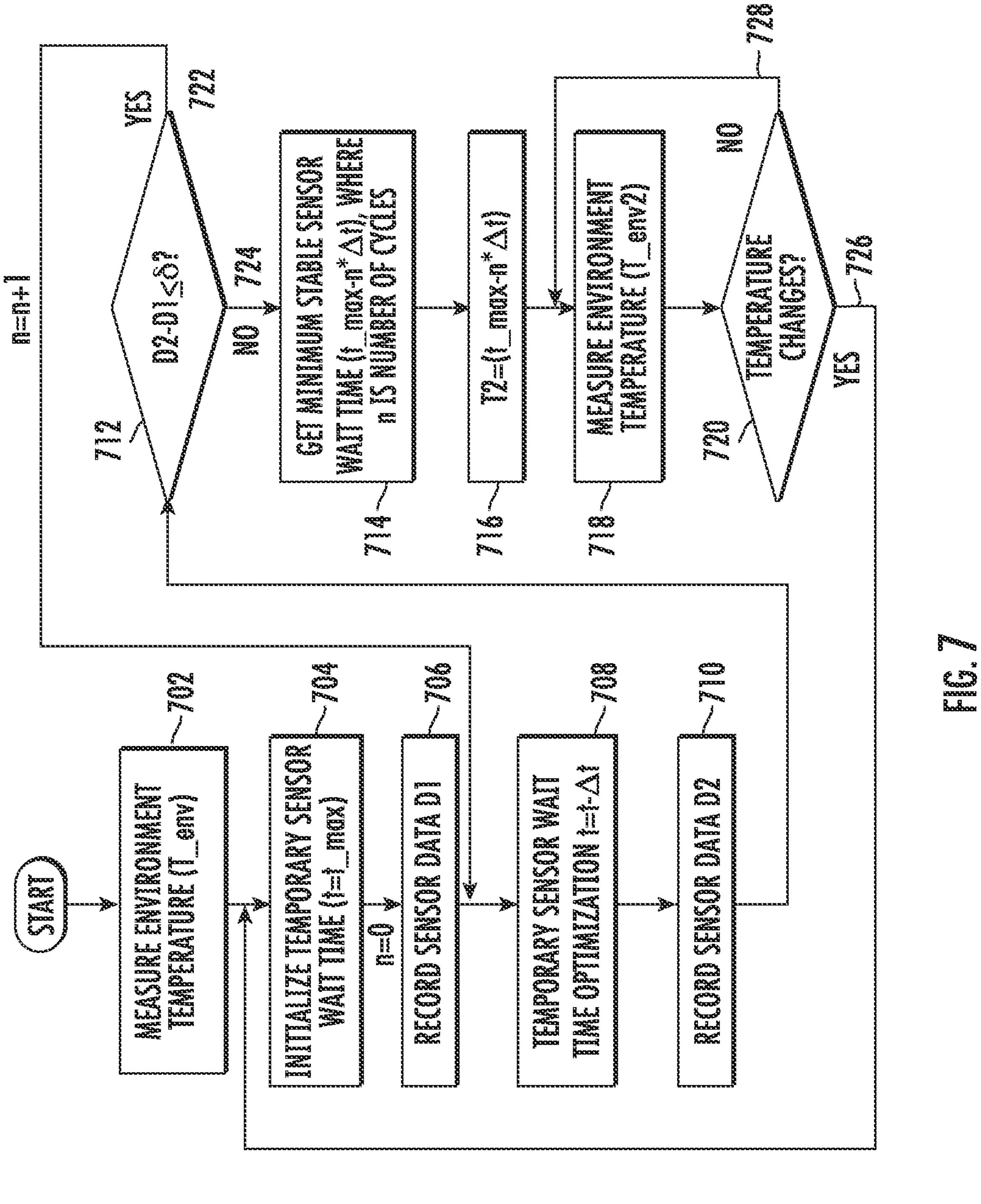
FIG. 7 illustrates an example flowchart for determining a sensor wait time in accordance with an example embodiment of the present disclosure.

Referring now to FIG. 7, an example embodiment of a process 700 for determining a sensor wait time based on a max stable time is provided. At step 702 the temperature of the environment surrounding the sensing device is measured (T_env). In some embodiments, the temperature may affect the output of the sensing device, for example, a pressure sensor. A measurement of the environment at the beginning of the procedure and a comparison to a measurement of the temperature at the end of the process 700 may indicate if any anomalies were the result in a change of environment temperature. In addition, a change in the surrounding environment may indicate a need for a change in a previously determined sensor wait time. Although depicted as a temperature measurement, any measurement of the physical environment may be received and compared to determine changes in the physical environment. For example, a pressure measurement, a humidity measurement, a sound measurement, a gas measurement, or other similar measurement.

At step 704, the temporary sensor wait time (t) is initialized to a max sensor wait time (t_max). In some embodiments, the manufacturer of a sensing device may provide a minimum stabilization time. In theory, this is the minimum time the sensor needs to be enabled before the measurements received from the sensing device may be considered stable. The minimum stabilization time may be determined by a manufacturer through testing and/or through analysis of the components of the sensing device. The minimum stabilization time may further include tolerances and additional time to ensure stable output measurements in all environments. The minimum stabilization time may be considered a maximum sensor wait time as it indicates the maximum time a sensing device may need to wait to ensure stable readings, however, the sensor wait time may be reduced from the minimum stabilization time based on the actual physical components of the sensing device and the physical environment in which the sensing device operates. As such, the minimum stabilization time may be the starting point for determining the minimum sensor wait time. The temporary sensor wait time may be initialized to the max sensor wait time at step 704. Through the process described herein, the temporary sensor wait time and eventual sensor wait time is reduced from the max stable wait time based on the physical operation of the sensing device and the physical operating environment.

In addition, the number of cycles (n) utilized to determine the minimum stable sensor wait time is set to 0. The number of cycles (n) will be updated as the temporary sensor wait time is reduced.

At step 706, the sensor data is recorded as value D1. The sensor data recorded (D1) represents the measurement returned from the sensor after the sensor has been enabled for at least the minimum stabilization time. By waiting the minimum stabilization time before recording the value D1, the sensing device has had sufficient time to stabilize and the recorded value D1 represents the measured output of the sensing device when the sensing device is stable.

At step 708, an adjustment is made to the temporary sensor wait time (t) based on a pre-determined delta time. With step 708 begins the process of incrementally reducing the time 1 representing the temporary sensor wait time, to determine a minimum stable time for the particular sensor in the particular environment. By determining a minimum stable time, the microcontroller in operation may only need to wait for the minimum stable time, instead of the full max sensor wait time before reading measurements from the sensing device. This may reduce the time a sensing device power control apparatus waits every time the sensing device is awakened from sleep mode. A new temporary sensor wait time is determined by subtracting a delta time (Δt) from the previous temporary sensor wait time. The pre-determined delta time may be determined experimentally based on the sensing device, the sensing environment, and the minimum stabilization time for the sensing device.

At step 710, the sensor data is recorded after expiration of the temporary sensor wait time (t). The sensing device is enabled for the determined temporary sensor wait time (t), and upon expiration of the temporary sensor wait time, the sensor data is recorded as D2. The recorded sensor data D2 represents the sensor reading after a reduced time allowing the sensing device to stabilize has passed.

At step 712, the difference in recorded sensor data D1 as compared to the recorded sensor data D2 is determined and compared to a sensor reading maximum variation (δ). The sensor reading maximum variation (δ) may be determined through an experimental process and/or based on the physical components of the sensing device. The sensor reading maximum variation (δ) may represent an acceptable range of deviation of the sensing device for which the sensing device measurements may still be considered stable. In an instance in which the difference between D1 and D2 is less than or equal to the sensor reading maximum variation, it is determined that the recorded sensor data D2 is a stable sensing device measurement and the temporary sensor wait time t may be used as a sensor wait time. In such an instance, the process 700 may follow the path 722 and return to step 708 for further reduction of the temporary sensor wait time t and further testing of the stability of the sensor data under the reduced temporary sensor wait time t. In addition, the number of cycles (n) is incremented to reflect the number of cycles executed to determine the minimum sensor wait time.

In an instance in which the difference between D1 and D2 is greater than the sensor reading maximum variation, it is determined that the recorded sensor data D2 resulting from the reduced temporary sensor wait time (t) is unstable and the temporary sensor wait time t is too short to be used as a sensor wait time. In such an instance, the process 700 may follow the path 724 and move on to step 714 for finalization of the sensor wait time (T2).

At step 714, the minimum stable time is determined. The number of cycles (n) necessary to reach a minimum stable sensor wait time is recorded, representing the number of incremental steps from the max sensor wait time that were taken to reach the minimum temporary sensor wait time.

At step 716, the determined stable time is saved as the sensor wait time (T2). For example, if t_max is determined by the manufacturer to be 300 milliseconds and the delta time (Δt) is 20 milliseconds, and further, if the number of successful cycles (n) executed to find the minimum sensor wait time is 4, then the sensor wait time (T2) is determined to be $t\_max - n*\Delta t = 300\text{ ms} - (4*20\text{ ms}) = 220\text{ ms}$. Thus, in such an instance, the sensor wait time T2 would be set to 220 milliseconds.

At step 718, the temperature of the environment is re-measured (T_env2). After completion of the update to the sensor wait time, the temperature of the environment is measured to determine if the temperature changed significantly during the update process to the sensor wait time.

At step 720, the initial temperature reading T_env is compared to the re-measured temperature T_Env2 measured at the conclusion of the determination of the minimum sensor wait time. If the temperature change is greater than a pre-determined threshold, the process returns on path 726 to step 704 to determine a new sensor wait time based on the updated environment conditions. However, if the temperature change is within a pre-determined threshold, the sensor wait time is held at the determined value (T2). The process 700 periodically follows the path 728 to re-measure the environment temperature (T_env2). In an instance in which the re-measured environment temperature (T_env2) is outside of the pre-determined threshold for an allowed temperature change, the process 700 returns on path 726 to determine a new minimum sensor wait time based on the updated environment conditions.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a pressure sensing device associated with a battery pack, for example, on an electric vehicle, however, the disclosure may relate to any sensing device operating under low power conditions and requiring high accuracy. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. An apparatus comprising:

a microcontroller; and a sensing device electrically connected to the microcontroller, wherein, in an instance in which the microcontroller is enabled, the microcontroller enables the sensing device and enters a low-power mode for a pre-determined sensor wait time, wherein, the microcontroller is further configured to, upon expiration of the pre-determined sensor wait time, receive electrical data from the sensing device, and wherein, upon receipt of the electrical data, the microcontroller disables power to the sensing device.

2. The apparatus of claim 1, further comprising:

a switch electrically connected between the sensing device and a power source, wherein the microcontroller is further configured to send an electrical signal to the switch to control an input power to the sensing device.

3. The apparatus of claim 1, further comprising two modes: (1) a sleep mode; and (2) an active mode, wherein, during the sleep mode, both the microcontroller and the sensing device are disabled, and wherein, at an onset of the active mode, the microcontroller and the sensing device receive power.

4. The apparatus of claim 3, further configured to alternate between the sleep mode and the active mode at a pre-determined interval.

5. The apparatus of claim 4, wherein the sleep mode has a longer duration than the active mode.

6. The apparatus of claim 1, wherein the microcontroller is configured to perform an action based on the electrical data after the microcontroller disables power to the sensing device, and wherein, the electrical data represents a physical characteristic of an environment proximate the sensing device.

7. The apparatus of claim 6, wherein the sensing device is in close proximity to a battery cell.

8. The apparatus of claim 7, wherein the sensing device comprises at least one of a pressure sensor, a temperature sensor, a gas sensor, and a sound sensor.

9. The apparatus of claim 8, wherein the action comprises at least one of determining an onset of thermal runaway in the battery cell and transmitting a warning.

10. The apparatus of claim 1, wherein the pre-determined sensor wait time is determined based at least in part on a minimum stabilization time for the sensing device.

11. The apparatus of claim 10, wherein the pre-determined sensor wait time is initially set to the minimum stabilization time and an initial sensor output correlated with the minimum stabilization time is determined, wherein, an update to the pre-determined sensor wait time is performed periodically by:

(1) determining an updated pre-determined sensor wait time by reducing the pre-determined sensor wait time by a delta time;

(2) determining an updated sensor output correlated with the updated pre-determined sensor wait time, and (3) in an instance in which the updated sensor output is within a threshold variation of the initial sensor output, set the pre-determined sensor wait time to the updated pre-determined sensor wait time.

12. The apparatus of claim 1, wherein the microcontroller is further configured to update the pre-determined sensor wait time based on an environment temperature at or near the sensing device.

13. A method for controlling a sensing device, the method comprising:

enabling, by a microcontroller, the sensing device;

entering, by the microcontroller, a low-power mode for a pre-determined sensor wait time;

upon expiration of the pre-determined sensor wait time, the microcontroller entering an operational mode and receiving electrical data from the sensing device; and upon receipt of the electrical data, the microcontroller disabling power to the sensing device.

14. The method of claim 13, further comprising:

sending an electrical signal to a switch electrically connected between the sensing device and a power source to control an input power to the sensing device.

15. The method of claim 13, further comprising:

alternating, by the microcontroller, between a sleep mode and an active mode at a pre-determined interval, wherein enabling the sleep mode, comprises entering into the low-power mode and disabling the sensing device, and wherein enabling the active mode, comprises entering into the operational mode and enabling the sensing device.

16. The method of claim 13, further comprising:

performing, by the microcontroller, an action based on the electrical data after the microcontroller disables power to the sensing device, wherein, the electrical data represents a physical characteristic of an environment proximate the sensing device.

17. The method of claim 16, wherein the action comprises at least one of determining an onset of thermal runaway in a battery cell proximate the sensing device and transmitting a warning.

18. The method of claim 13, wherein the pre-determined sensor wait time is determined based at least in part on a minimum stabilization time for the sensing device.

19. The method of claim 18, further comprising:

updating, by the microcontroller, the pre-determined sensor wait time, wherein the pre-determined sensor wait time is initially set to the minimum stabilization time and an initial sensor output correlated with the minimum stabilization time is determined, and wherein, an update to the pre-determined sensor wait time is performed periodically by:

(1) determining an updated pre-determined sensor wait time by reducing the pre-determined sensor wait time by a delta time, (2) determining an updated sensor output correlated with the updated pre-determined sensor wait time, and (3) in an instance in which the updated sensor output is within a threshold variation of the initial sensor output, setting the pre-determined sensor wait time to the updated pre-determined sensor wait time.

20. A computer program product for controlling a sensing device, the computer program product comprising at least one non-transitory computer-readable storage medium having computer-readable program code portions stored therein, the computer-readable program code portions comprising an executable portion configured to:

enable, by a microcontroller, the sensing device;

enter, by the microcontroller, a low-power mode for a pre-determined sensor wait time;

upon expiration of the pre-determined sensor wait time, the microcontroller enters an operational mode and receive electrical data from the sensing device; and upon receipt of the electrical data, the microcontroller disables power to the sensing device.

* * * * *